United States Patent [19]

Bier

[11] 4,030,350
[45] June 21, 1977

[54] APPARATUS FOR SIMULATING VARIABLE AIR PRESSURES

[75] Inventor: Manfred Bier, Weissach, Germany

[73] Assignee: Porsche AG, Germany

[22] Filed: Aug. 13, 1976

[21] Appl. No.: 714,178

[30] Foreign Application Priority Data

Aug. 13, 1975 Germany .............................. 2536047

[52] U.S. Cl. ................................... 73/117.1; 73/23
[51] Int. Cl.[2] ........................................ G01M 15/00
[58] Field of Search ................ 73/117.1, 115, 116, 73/49.7, 23

[56] References Cited

UNITED STATES PATENTS

| | | | |
|---|---|---|---|
| 2,615,331 | 10/1952 | Lundgren | 73/117.1 |
| 3,610,047 | 10/1971 | List et al. | 73/116 X |
| 3,822,581 | 7/1974 | Hauck et al. | 73/116 X |

Primary Examiner—Jerry W. Myracle
Attorney, Agent, or Firm—Craig & Antonelli

[57] ABSTRACT

An apparatus for the simulation of variable air pressures, particularly for analyzing the influence of variable air pressures on the exhaust emissions, power output, and fuel consumption of an internal combustion engine includes a canister connected to the engine by way of its intake and exhaust pipes. A vacuum pump is connected with the cannister to withdraw the contents thereof and a throttle valve is associated with a further opening in the canister for regulating the air input to the canister irrespective of the operating conditions and range of the engine. This throttle valve device is formed as a self-regulating throttle device.

10 Claims, 2 Drawing Figures

APPARATUS FOR SIMULATING VARIABLE AIR PRESSURES

FIELD OF THE INVENTION

The present invention relates to an apparatus for simulating variable air pressures, particularly to be used for the analysis of the influence of variable air pressures on exhaust emissions, power output, and fuel consumption of internal combustions engines. The invention is particularly directed to such an apparatus employing a canister to which a vacuum pump is connected and which is provided with an opening operatively cooperating with a variable throttle device and a further opening connected to the exhaust pipe of the internal combustion engine.

BACKGROUND OF THE INVENTION

In one type of test apparatus for simulating variable air pressures for analyzing the operation of internal combustion engines, a canister, having a variable throttle valve device, is connected to receive the exhaust gas of the internal combustion engine. The combustion air of the internal combustion engine is supplied by way of an intake pipe directly from the atmosphere. A regulating valve is inserted in this intake pipe which is connected with the canister by way of a control line. The canister is provided with a valve for regulating the air being drawn into the tank which, together with the exhaust gas, is removed from the tank by a pump. Depending upon the position of the regulating valve, the vacuum in the canister may be altered, in order to establish, by way of the control line, that a vacuum exists at the regulating valve, so that suction intake operation of the engine occurs under the same conditions as the expulsion of the combustion gases.

In this device, however, it is especially disadvantageous in that the vacuum within the canister, once established by the regulating valve, continually changes during intermittent operation of the engine as a result of continuous changes in the exhaust gas flow. The intake air of the internal combustion engine regulated in accordance with the regulating in accordance with the regulating valve, must always be matched to the changing exhaust-gas flow changes. This is possible only by way of frequent regulation, so that the operating liability of such a test apparatus is considerably reduced. For a more detailed explanation of this apparatus, see German Patent Publication 317052.

SUMMARY OF THE INVENTION

It is an object of the present invention to provide an apparatus for simulating variable air pressures, especially for analyzing the influence of variable air pressures on the exhaust emissions, power output, and fuel consumption of internal combustion engines, having a simpler construction and an operating reliability considerably improved with respect to the above-described conventional apparatus, during intermittent or non-steady operation of the engine.

To this end, the canister which is connected to the internal combustion engine, proper, is provided with a further opening with which the intake pipe of the internal combustion engine is connected and the variable throttle device is constructed as a self-regulating device. By virtue of this arrangement, the air which is required for combustion within the internal combustion engine is extracted from the canister connected thereto and the exhaust gases discharged from the engine are also supplied to the canister. Moreover, the volume of exhaust gases discharged is, at the most, only 5% larger than the volume of air taken in by the engine, so that only minor regulating movements of the throttle device occur even for large gas flow changes of the internal combustion engine during non-steady of intermittent operation, as for example, during exhaust gas emission tests.

An advantage of this arrangement is that the passageway for the air which enters the canister and is the combustion air for the internal combustion engine is drawn in through an opening in the canister disposed in the immediate vicinity of the intake pipe of the engine. For removing exhaust gases from the tank, it is especially effective to provide the opening in the canister which is connected with the exhaust pipe of the engine in the immediate vicinity of a corresponding opening in the canister from which a vacuum pump draws the exhaust gases out of the canister.

The openings for the intake and exhaust pipes for the canister may be arranged so that the exhaust pipe to which the vacuum pump is connected is directly opposite the opening of the exhaust pipe for the internal combustion engine, or may be disposed perpendicular thereto.

The throttle device may be formed by a cone-shaped construction of the canister where the opening operatively cooperates with the throttle device, with a throttle element be arranged in this con-shaped portion and a manually adjustable force engaging the throttle element to regulate the cross-sectional flow area of the throttle device.

By disposing a vacuum pump connected to a suction pipe for withdrawing exhaust gases from the canister and for withdrawing the exhaust gases from the engine, the arrangement is made inexpensive. The volume of gas drawn into the vacuum pump is preferrably larger than the exhaust volume discharged by the internal combustion engine.

DETAILED DESCRIPTION

Figure 1:
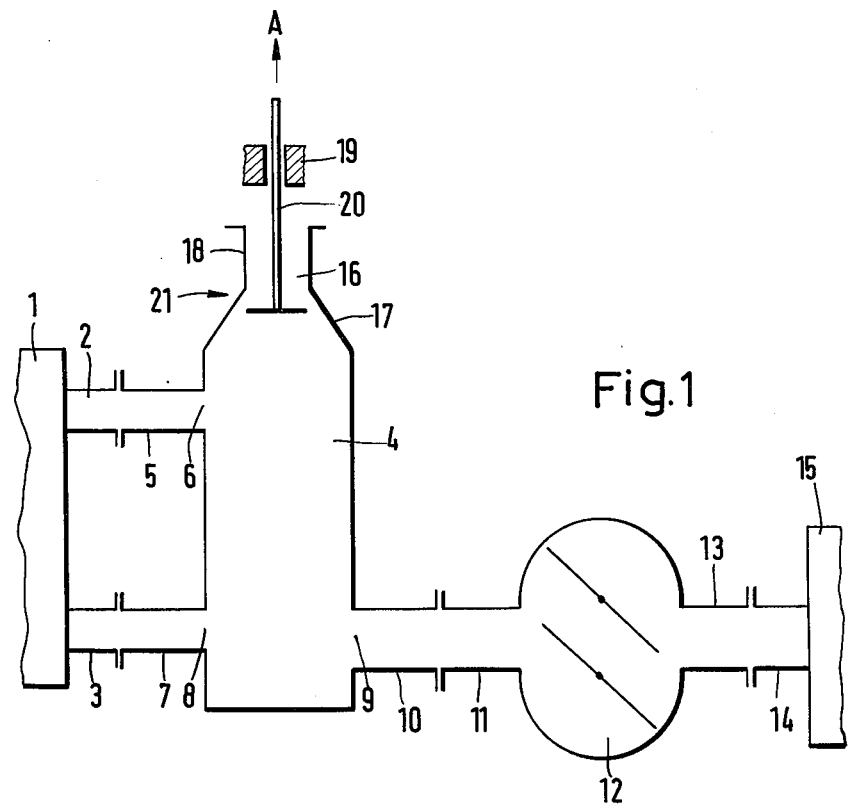
FIG. 1 shows an apparatus for simulating variable air pressures, for analyzing an internal combustion engine, in which the opening of the canister which is connected with the exhaust pipe of the engine is disposed opposite the pipe which is connected to the vacuum pump.

Referring now to FIG. 1, which illustrates a first embodiment of the invention, an internal combustion engine 1 has an air intake pipe 2 and a combustion exhaust pipe 3. These two pipes are respectively connected to openings 6 and 8 of a canister 4 by way of connecting pipes 5 and 7. The canister 4 has another opening 9 disposed substantially opposite the opening 8, which opening 9 is provided with a connecting pipe 10 which connects to suction pipe 11 of a vacuum pump 12. The vacuum pump 12 has a connecting pipe 13 which is connected to a corresponding pipe 14 of an exhaust test apparatus 15. Device 15 may be, for example, a standard exhaust emission test device according to the CVS-exhaust-test method (the official test method of the United States — World-Wide Safety Authority).

The canister 4 is provided with a further opening 16 in the vicinity of the opening 6 for the air intake for the engine, formed by a small diameter cone-shaped construction 17 and an air intake pipe 18. The throttle device 21 consists of this opening 16, the pipe 18 and a throttle element 20 which passes through an aperture in a wall 19 external to the canister 4 and operatively cooperates with the opening 16. Arrow A indicates a manually adjustable force applied to the element 20.

In operation, after the internal combustion engine is running, and with the vacuum pump 12 providing a sufficient vacuum within the canister 4, exhaust gases from the internal combustion engine are drawn out of the canister 4 and into the exhaust test apparatus 15. Air is drawn through the throttle device 21 of the canister 4, the opening cross-section of which being adjusted prior to the start of operation of the engine by throttle element 20 corresponding to the level of operation to be simulated. part of the air which is introduced through the valve 21 is supplied through pipe 5 to air intake pipe 2 of the engine while the other part is mixed with the exhaust gases emitted through opening 8 into the canister 4 to be removed through the opening 9 and onto the exhaust apparatus 15 by operation of the vacuum pump 12.

During non-steady or intermittent operation of the engine, a larger quantity of air is required for combustion, as occurs with a change in load operation of the engine, which is drawn out from canister 4. At the same time, a larger volume of exhaust gases is supplied to the canister 4 through opening 8 from the internal combustion engine corresponding to the new load condition on the engine. In order to maintain the once established air pressure in the canister 4, it in only necessary that the self-regulating throttle device 21 adjust the cross-sectional opening 16 corresponding to the difference between the amount of exhaust gas and combustion air. By such an adjustment, it can be assured that once adjusted, the air pressure within the canister 4 remains the same during intermittent or non-steady operation of the internal combustion engine. A mixing of the exhaust gases with the combustion air in the canister 4 is avoided so that the volume of flow which is extracted from the canister by the vacuum pump will be larger than the maximum amount of exhaust gases emitted. In this manner, the continuous fresh air flow is supplied from the opening 6 into the canister 4 to its opening 9 which prevents exhaust gases from once again entering the opening 6 at the intake to the internal combustion engine.

Figure 2:
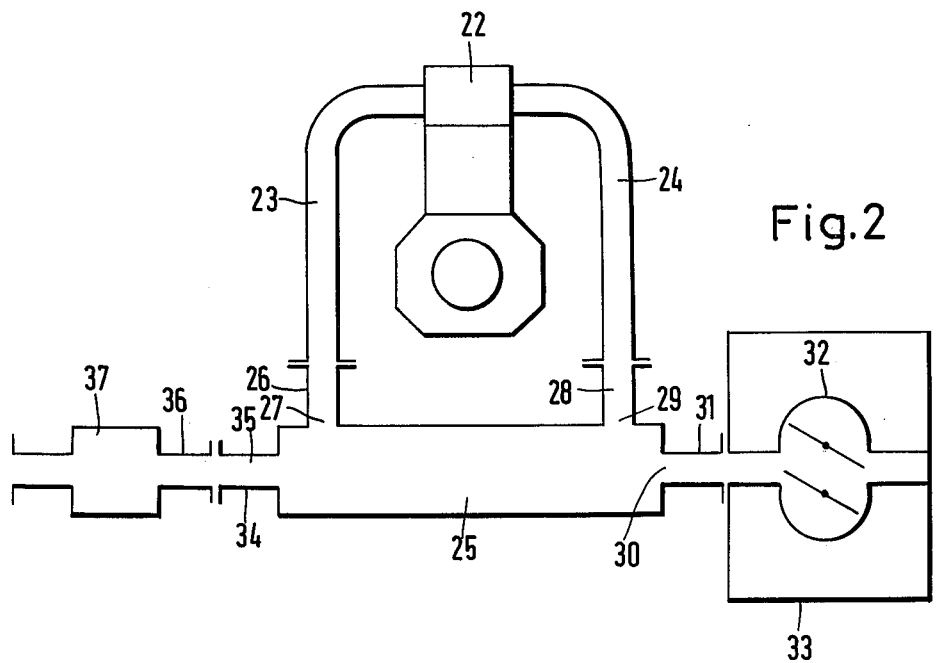
FIG. 2 shows an embodiment of an apparatus for simulating variable air pressure for analyzing an internal combustion engine, in which the opening for the exhaust gases from the engine is disposed in the vicinity of but perpendicular to the opening of the canister to which the vacuum pump is connected.

Another embodiment of the invention is shown in FIG. 2, wherein a canister 25 has a pair of openings 27 and 29, connected to the air intake pipe 23 and the exhaust pipe 24 by way of connecting pipes 26 and 28, respectively, the pipes 23 and 24 being coupled to the engine 22. The throttle device, per se, is designated by element 37 in FIG. 2, which is connected by way of pipes 36 and 34 to the air intake opening 35 of the canister 25. The exit opening of the canister is the opening 30 which is connected by way of pipe 31 to test apparatus 33 which contains a vacuum pump 32. In this embodiment, the exhaust opening for the canister 30 is in the vicinity of but perpendicular to the exhaust opening 29 by way of which exhaust gases from the engine 22 pass from the pipe 24 into the canister 25.

In operation, with the internal combustion engine being operated in an intermittent or non-steady state, for a change in load operation, a corresponding possible air pressure change ratio in the tank 25, due to a uniform output of the pump 32 on the one hand, and output regulation of the internal combustion engine 22 being cut off, on the other hand, is counteracted by the self-regulating throttle device 37, so that the initially established air pressure in the canister 25 remains the same throughout the operating range of the internal combustion engine 22.

It can be seen, therefore, that in accordance with each of the embodiments of the invention shown in FIGS. 1 and 2, a self-adjusting throttle valve connected with the canister 4 and the arrangement of the vacuum pump therewith permits maintenance of an initially established pressure within the canister 4.

While I have shown several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. In an apparatus for simulating variable air pressure, particularly for the analysis of the influence of variable air pressures on the exhaust emission, power output and fuel consumption of an internal combustion engine, said apparatus including a cansiter which has first and second openings respectively coupled to the exhaust port of the internal combustion engine and a vacuum pump withdrawing gases from said canister, and a third opening coupled with a variable throttle device for adjusting the flow of air into said canister, the improvement wherein
said canister is further provided with a fourth opening coupled to the air intake port of said engine, and wherein said variable throttle device is a self-regulating throttle device.

2. The improvement according to claim 1, wherein said air intake port of said engine is connected with said canister so that the entirety of the air for combustion is said engine is drawn in through said throttle device.

3. The improvement according to claim 2, wherein said third and fourth openings of said canister are arranged in the immediate vicinity of each other so as to face in directions perpendicular to each other.

4. The improvement according to claim 3, wherein said throttle device is formed of a portion of said canister, said portion being cone-shaped in the area of said third opening, and includes a throttle element disposed in said third opening, to which element a manually adjustable force is coupled to regulate the cross-sectional flow area of said third opening.

5. The improvement according to claim 4, wherein said first and second openings of said canister are arranged in the vicinity of each other on opposite sides of said canister so as to face each other.

6. The improvement according to claim 1, wherein said first and second openings of said canister are arranged in the vicinity of each other on opposite sides of said canister so as to face each other.

7. The improvement according to claim 6, wherein the volume of gas drawn by said vacuum pump exceeds the maximum exhaust volume discharge by said engine.

8. The improvement according to claim 1, wherein said first and second openings of said canister are arranged in the vicinity of each other so as to face in directions perpendicular to each other.

9. The improvement according to claim 8, wherein said vacuum pump is a pump contained within an exhaust analysis device coupled to said second opening of said canister.

10. The improvement according to claim 9, wherein the volume of gas drawn by said vacuum pump exceeds the maximum exhaust volume discharge by said engine.

* * * * *